Feb. 20, 1934.                J. B. TAYLOR                    1,948,363
                              DUST SEPARATOR
                           Filed May 27, 1927            3 Sheets-Sheet 1
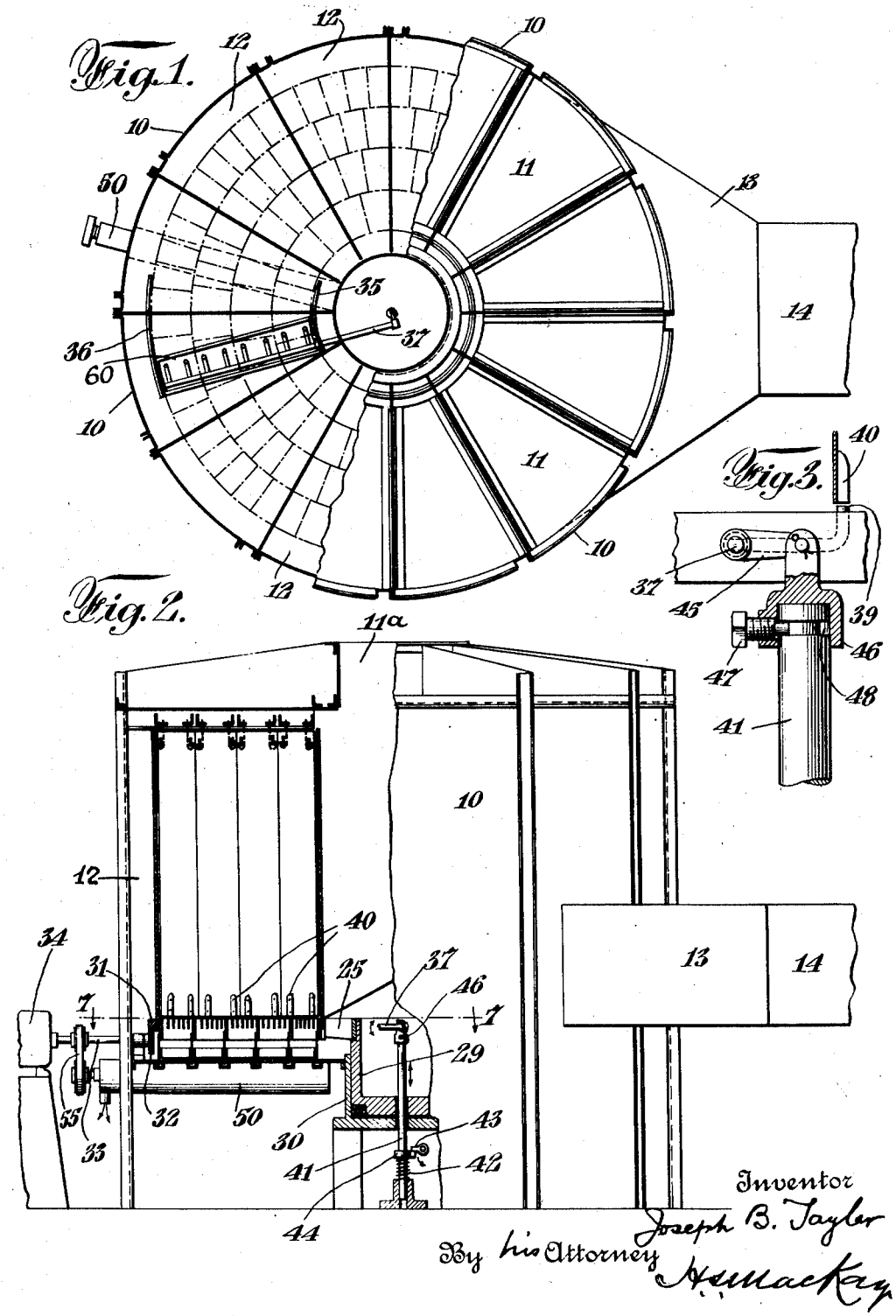
Inventor
Joseph B. Taylor
By his Attorney
H. MacKay Feb. 20, 1934. J. B. TAYLOR 1,948,363
DUST SEPARATOR
Filed May 27, 1927 3 Sheets-Sheet 2
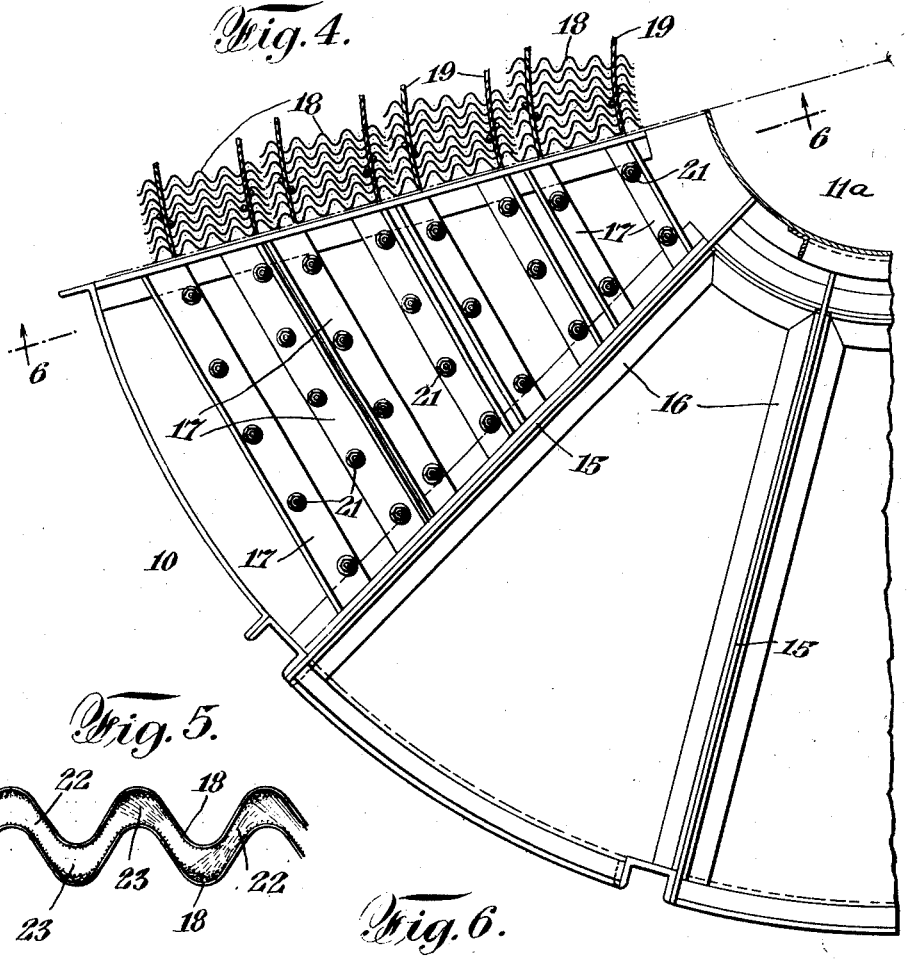
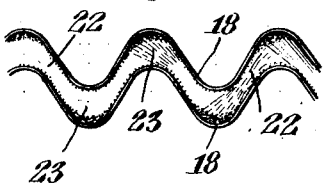
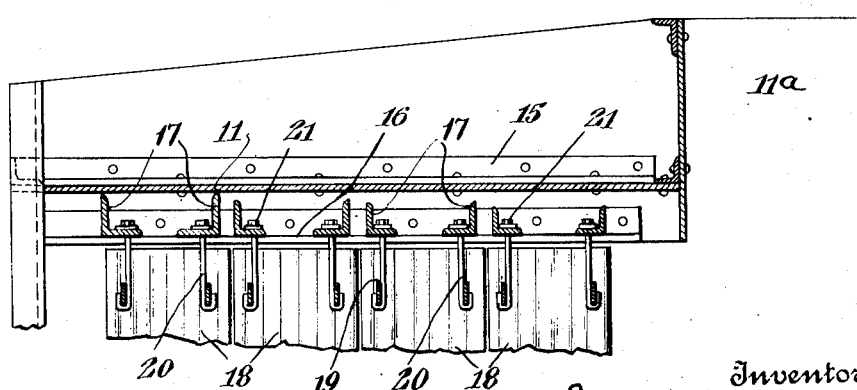

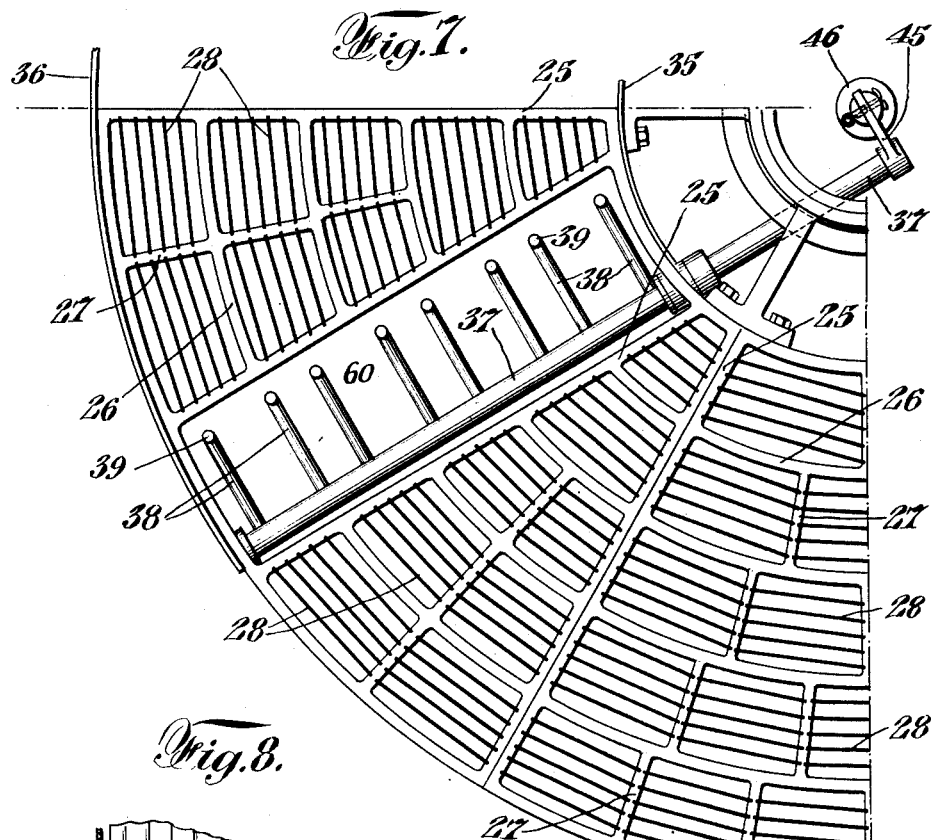
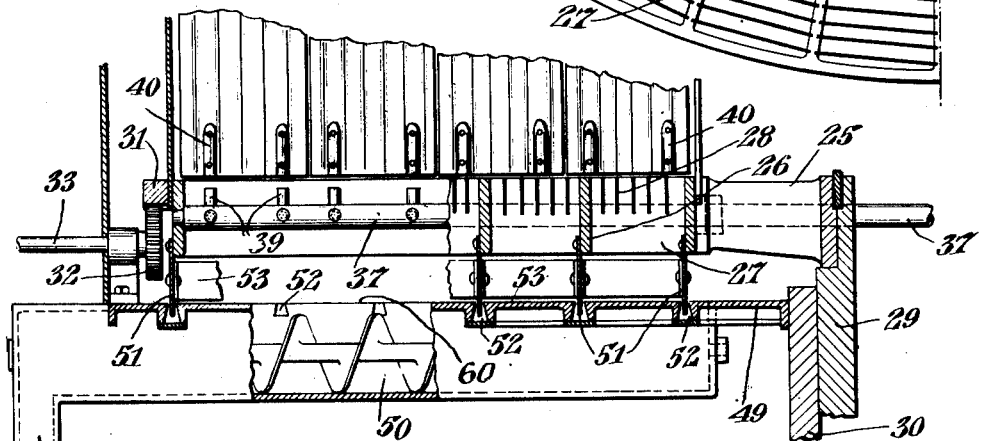

Patented Feb. 20, 1934

1,948,363

UNITED STATES PATENT OFFICE 1,948,363

DUST SEPARATOR

Joseph B. Taylor, Allendale, N. J., assignor to By-Products Recoveries, Inc., New York, N. Y., a corporation of New York Application May 27, 1927. Serial No. 194,553

17 Claims. (Cl. 183—76)

The present invention relates to an improved apparatus for separating and collecting all kinds of dust and fumes held in suspension by air or gas, whereby a very high percentage of the total suspended matter may be recovered by simple and inexpensive means. My improved apparatus can be readily assembled and taken apart for repairs and replacement, and lends itself to a great variety of industrial applications.

The invention is illustrated in a preferred form in the accompanying drawings wherein Figure 1 is a plan view of the same with a portion of the outer top casing removed, Figure 2 is a view of the same, partly in elevation and partly in section, Figure 3 is an enlarged view of a detail, Figure 4 is a view partly in plan and partly in horizontal section of a portion of the dust separator, Figure 5 is an enlarged plan view of two collecting plates, as assembled for use, Figure 6 is a partial view in vertical section of the apparatus on the line 6—6 in Figure 4, Figure 7 is a partial view in horizontal section on the line 7—7 in Figure 2, Figure 8 is a view in vertical radial section of a portion of the device, Figure 9 is a view in perspective of a portion of a collector plate, and Figure 10 is a sectional view of a portion of one of said plates as preferably constructed.

My apparatus comprises a stationary portion acting as a dust separator, which acts to remove the dust from the air or gas, and a normally moving portion which receives the dust progressively removed from the dust separator collector and delivers it to means which discharge it finally from the apparatus. The last named means is also preferably stationary.

The apparatus as shown specifically herein may be taken as a typical example or embodiment of my invention, and is preferably constructed of sheet metal, although that is not the only material of which it may be composed.

The specific embodiment of my invention herein shown and described is preferably circular in general form and is adapted for the separation of dust from gases moving radially.

The advantage of the radial movement of gas or air is, obviously, that the velocity of the air or gas stream decreases as it progresses from center to circumference. This, of course, favors the collection of the coarser dust at or near the center, while the very fine dust is taken up near the circumference where the force of the air or gas current is greatly diminished by virtue of its decreased velocity.

In the form herein shown and described, the apparatus comprises an outer cylindrical stationary shell or casing 10 and a preferably removable roof 11 within which elements the working parts of the apparatus are made to function.

The air or gas carrying the dust to be removed enters through a central conduit 11a, and passes radially through the stationary dust separator to an annular passage 12 surrounding the latter. This annular passage opens on one side into a funnel-shaped exit 13, which leads to the final discharge pipe 14, for carrying off the air or gas after dust removal has been accomplished.

The dust separator is preferably divided into sectors at the top by radially supported suspension ribs 15, having flanges 16 (see Fig. 4) and upon these flanges rest the angle bars 17 from which are hung the dust separating plates 18, preferably in the following manner.

As plainly shown in Figures 4 and 5, the plates 18 are wavy in outline as viewed in plan, and extend in radial directions from the inlet 11a toward the circumferential passage 12. These plates so placed, form sharply curved passages between contiguous plates, through which the dust-laden air or gas finds its way to the passages 12 and 13 and finally to the outlet pipe 14.

In each sector between successive ribs 15, the plates 18 are strung upon separate short carrying bars 19, which are carried in hooks 20, passing upward through the bars 17, being secured by nuts 21 which screw onto the upper ends of said hooks 20. (See Figs. 4 and 6.)

As shown in Figure 5, it is preferred to so form and arrange the curved plates 18 that each intermediate passage (considered with reference to its width normal to the axis of the stream flow) presents a series of successive narrow portions 22 through which the air or gas is projected against the concave side of an immediately contiguous wider portion 23. The air or gas as it leaves the portion 22 and enters the wider portion 23 naturally loses velocity, thereby promoting the depositing of the dust upon the concave wall of said wider portion, as indicated in Figure 5. Of course the centrifugal force resulting from the form of the passage through which the air or gas is passing assists in causing separation of the dust in each passage 23.

In order to further promote collection of dust upon the plates 18, they are preferably roughened, and in Figures 9 and 10 is shown the preferred mode of producing this roughening, where used. For this purpose the plates 18 are punched at close intervals, like a cheese grater, so as to produce openings 24 with sharply serrated edges.

In order to accomplish progressive removal of the dust collected on the plates 18, without interrupting the operation of the machine, I prefer to combine with the dust separator thus far described a revolving dust receiver adapted to disengage the dust from different sections of the dust separator element in succession. This revolving element is so constructed as to shut off the current of air or gas from the particular section of the dust separator from which the dust is being removed.

Figure 7 shows in plan a portion of the preferred construction of the revolving dust receiver. It is formed in sectors by radial ribs 25, connected by a grating of secondary ribs 26 and 27, extending respectively in a circular and a radial direction.

The radial ribs are slotted to permit the insertion of vertical draft-breaking plates 28, which serve to oppose the travel of air or gas radially under the plates 18 intended to receive the dust.

The main casting of the revolving grating thus described is keyed to a downwardly extending hub 29, turning on ball bearings within a cylindrical bearing 30 (see Fig. 2).

At its periphery this grating carries a circular rack 31, engaged by a gear 32 on a shaft 33, driven by an electric motor 34, or other source of power.

A limited angular portion of the dust receiver is furnished with means for jarring the plates 18 in succession as the dust collector revolves. This "jarring sector" carries with it the inner shield 35 and the outer shield 36 which extend the whole vertical height of the dust receiver. These shields prevent passage of air or gas through those portions of the dust collector which are being temporarily acted upon by the hammers in the "jarring sector", thus permitting the dust knocked off of the plates 18 to settle quietly down upon the final receiving floor hereinafter described.

The preferred jarring apparatus, as shown in the specific form of my invention here presented is constructed as follows.

Extending outward from near the center to the circumference within the area of the "jarring sector" is a revolubly mounted shaft 37, carried by the revolving dust receiver, and moving around with it. This shaft carries arms 38, furnished with hammers 39, adapted to strike against metal anvils 40, riveted or otherwise fixed to the bottoms of the plates 18 (see Figure 8). These anvils are wide enough to prevent the hammers 39 from striking between two anvils at any time, without striking either.

In order to cause the shaft 37 to swing back and forth, and so cause intermittent swinging movements of the hammers, the following structure may be used.

At the center of the apparatus is mounted a central reciprocating bar 41, normally held in elevated position by a spring 42 (see Figs. 2 and 3). A revolving cam 43, actuated in any desired manner acts intermittently upon a collar 44 to momentarily depress the bar 41; but as soon as the cam 43 passes, the spring 42 imparts a quick upward movement to the bar 41.

These quick sudden upward movements of the bar 41 are transmitted through the shaft 37 to produce quick upward blows of the hammers 39 against the anvils 40, in the following manner.

The shaft 37 carries an arm 45 which is pivotally connected with a head 46 on the top of the bar 41. This head is free to revolve around the bar 41, being fixed thereto by a screw or bolt 47 which enters a circular groove 48 around the top of the bar 41, thus, as the bar 41 moves up and down it rocks the arm 45, and causes the hammers 39 to strike the anvils 40 on the plates 18.

This percussion within the space protected by the shields 35 and 36 causes the dust gathered on the plates 18 to fall upon the stationary receiving floor 49 which extends all around under the dust separators, save where it opens into the top of a radially disposed screw conveyor 50 of any well known type.

The circularly disposed ribs 26 of the revolving receiver are provided with baffle plates 51, circularly disposed, which enter circular dust pockets 52 (see Fig. 8) thus preventing the air or gas from escaping under the dust-separating plates.

Vertical scraper plates, or blades 53 extend radially between the baffle plates 51, and revolve with the dust receiver grating, so as to push before them the dust falling from the plates 18. The plates 53 carry this dust around on the floor 49 until it reaches the opening 60 over the screw conveyor, through which it falls being finally carried to the dust exit pipe 54. The means for operating the screw conveyor may be of any character, but in the form shown the conveyor is driven by a belt 55 driven by the shaft 33.

It will be clear from the above description that, while the dust is being constantly taken up from the moving air or gas by the stationary separator, the revolving receiver is continually removing the dust so separated and collected from successive sections of the dust separator, and sweeping the same into the conveyor which finally carries it off.

Various changes can be made in my device without departing from the scope of my invention, which is not limited to the details herein shown and described.

What I claim is—

1. Means for separating dust from gases comprising a dust separator, in combination with a dust receiver and jarring means, means for providing relative movement between said jarring means and said dust separator, said dust separator comprising collecting plates provided with anvils, and said jarring means comprising automatic hammers adapted to strike said anvils.

2. In an apparatus of the character described a dust receiver, said receiver comprising a revoluble part and a floor having a discharge opening and circularly disposed dust pockets, and baffle plates carried by the revoluble part of said dust receiver and extending into said pockets.

3. A circular dust separator divided into sectors and having separate removable dust separating means in each sector.

4. In combination a dust separator comprising plates for collecting dust, and a dust receiver said dust receiver having a revoluble part and a radially disposed shaft thereon carrying hammers and centrally placed operating means adapted to cause swinging movements of said shaft to operate said hammers, said shaft and hammers being arranged below said plates and adapted to strike the lower edges thereof to dislodge dust.

5. Apparatus as in claim 4 wherein the central operating means comprise a reciprocating upright rod connected with the radial shaft, and means for causing up and down movements of said rod.

6. Apparatus for separating dust from gas streams, comprising a radially expanding chamber, means for directing a flow of gas radially of said chamber in a manner to expand and lose velocity as it flows through said chamber, and successive surfaces in said chamber arranged along the direction of flow, against which said gas stream is adapted to impinge and deposit dust particles, said surfaces being constituted by successive rows of vertical rectangular corrugated plates running substantially radially in the direction of flow of the gas stream.

7. Apparatus according to claim 6, wherein the area of said impingement surfaces is increased in the direction of enlargement of said chamber, said surfaces having rough surface projections.

8. Apparatus for separating dust from gas streams, comprising a radially expanding chamber, means for directing a flow of gas radially of said chamber in a manner to expand and lose velocity as it flows through said chamber, and successive surfaces in said chamber arranged along the direction of flow, against which said gas stream is adapted to impinge and deposit dust particles, said surfaces being constituted by successive rows of vertical rectangular corrugated plates running substantially radially in the direction of flow of the gas stream, said surfaces having rough surface projections.

9. Apparatus for separating dust from gas streams, comprising a radially expanding chamber, means for directing a flow of gas radially of said chamber in a manner to expand and lose velocity as it flows through said chamber, and successive surfaces in said chamber arranged along the direction of flow, against which said gas stream is adapted to impinge and deposit dust particles, said surfaces being constituted by successive rows of vertical rectangular corrugated plates running substantially radially in the direction of flow of the gas stream, the plates being deeply corrugated and arranged with the tips of the corrugations overlapping, whereby the path of flow between adjacent sheets normal to the gas flow is materially narrower between successive corrugations than at the corrugations.

10. Means for separating dust from gases comprising a casing, a gas inlet and outlet, said casing having flow-confining portions increasing in cross-sectional area in the direction of the flow of gas therethrough, and a plurality of dust-separating plates in said casing against which the dust-laden stream is adapted to impinge, the number of said plates increasing in the direction of the flow of gas.

11. Means for separating dust from gases comprising a casing, a gas inlet and outlet, said casing having flow-confining portions increasing in cross-sectional area in the direction of the flow of gas therethrough, and a plurality of dust-separating plates in said casing against which the dust-laden stream is adapted to impinge, said plates being arranged generally in line with planes converging on a common axial line.

12. Means for separating dust from gases, comprising a casing, a plurality of dust-separating plates in said casing between which streams of dust-laden gas are adapted to flow and against the surface of which the gas is adapted to impinge, shields in said casing adapted to shield the gas-passages between plates of a portion of said set of plates, to quiet the gas flow in said shielded portion, means producing relative movement of said shields and plates so that successive portions or sets of said plates may be shielded, and means for jarring said plates while in said shielded position to dislodge dust in a zone of calm.

13. An apparatus according to claim 12, further including means at the lower ends of said plates to obstruct flow of gas under said plates.

14. An apparatus according to claim 12, wherein said jarring means are arranged to act on said plates at right angles to the direction of flow between the plates.

15. In means for separating dust from air or gas, a pair of juxtaposed corrugated dust separating plates having the surfaces against which the dust laden stream impinges roughened by numerous ruptures, said ruptures having rough serrated edges to assist the precipitation of dust on said plates.

16. Apparatus according to claim 15 wherein each passage between said corrugated plates comprises narrow portions discharging into wider portions and against the concave wall of the latter.

17. Means for separating dust from gases comprising a casing, a plurality of spaced corrugated dust separating plates in said casing arranged face to face, said corrugations being deep and rounded and arranged with the tips of corrugations of one plate extending beyond a line drawn along the tips of the corrugations on the opposite plate, the path between opposite plates having alternate constrictions between the bends and enlargements at the bends, said plates having numerous barbs on the surfaces against which the dust-laden gases impinge.

JOSEPH B. TAYLOR.